(12) United States Patent
Didehvar

(10) Patent No.: US 8,827,587 B2
(45) Date of Patent: Sep. 9, 2014

(54) TENSION ROD MECHANISM WITH OPPOSING THREADS

(75) Inventor: Kaveh Didehvar, Hockessin, DE (US)

(73) Assignee: Zenith Products Corporation, New Castle, DE (US)

( * ) Notice: Subject to any disclaimer, the term of this patent is extended or adjusted under 35 U.S.C. 154(b) by 246 days.

(21) Appl. No.: 13/268,712

(22) Filed: Oct. 7, 2011

(65) Prior Publication Data

US 2012/0152872 A1    Jun. 21, 2012

Related U.S. Application Data

(60) Provisional application No. 61/424,458, filed on Dec. 17, 2010.

(51) Int. Cl.
| | |
|---|---|
| F16B 2/14 | (2006.01) |
| F16B 7/04 | (2006.01) |
| A47H 1/022 | (2006.01) |
| F16B 7/06 | (2006.01) |

(52) U.S. Cl.
CPC . *A47H 1/022* (2013.01); *F16B 7/06* (2013.01)
USPC ........ 403/374.4; 403/369; 403/370; 403/371; 211/105.3; 211/123; 248/265

(58) Field of Classification Search
USPC ............ 403/368–371, 374.1–374.4; 248/253, 248/263–265; 211/105.1–105.4, 123
See application file for complete search history.

(56) References Cited

U.S. PATENT DOCUMENTS

| | | |
|---|---|---|
| D19,582 S | 1/1890 | Lau |
| 653,642 A | 7/1900 | Darling |

(Continued)

FOREIGN PATENT DOCUMENTS

| | | |
|---|---|---|
| CH | 625601 A5 | 9/1981 |
| CN | 2221357 Y | 3/1996 |

(Continued)

OTHER PUBLICATIONS

<http://plumbing.hardwarestore.com/51-283-shower-rods-and-holders/stanless-steel-curved-shower-rod-609421. aspx>; "Stanless Steel Curved Shower Rod, 1" x5'"; web page printout date: Feb. 10, 2010; original web posting date: unknown, 1 page. (admitted prior art).
Office Action issued Jul. 8, 2011 in U.S. Appl. No. 11/833,044.
U.S. Appl. No. 13/253,617, filed Oct. 5, 2011.
Office Action issued Dec. 11, 2012 in U.S. Appl. No. 29/381,234.
Notice of Allowance issued Jul. 24, 2012 in U.S. Appl. No. 29/422,283.

(Continued)

*Primary Examiner* — Daniel P Stodola
*Assistant Examiner* — Jonathan Masinick
(74) *Attorney, Agent, or Firm* — Panitch Schwarze Belisario & Nadel LLP

(57) ABSTRACT

A tension rod mechanism for a tension rod having a first outer shaft with a second inner shaft slideable therein. A first collar receiveable in the first outer shaft of a tension rod for rotational movement therewith and slidable axial movement relative thereto threadingly engages a tapered first threaded shaft and is configured to apply a outwardly-directed radial force to the first outer shaft. A second collar fixedly receivable in the second inner shaft for movement therewith engages the second threaded shaft. A first rotation of the first outer shaft relative to the second inner shaft increases the outwardly-directed radial force applied by the first collar to the first outer shaft, and a second rotation in an opposite direction increases the axial distance between the first and second collars.

3 Claims, 3 Drawing Sheets

(56) References Cited

U.S. PATENT DOCUMENTS

| | | |
|---|---|---|
| 839,959 A | 1/1907 | Richards |
| 1,481,730 A | 1/1924 | Oakley |
| 1,502,154 A | 7/1924 | Meuller |
| 1,675,111 A | 6/1928 | Kenney |
| 1,679,881 A | 8/1928 | Simpson |
| 1,721,305 A | 7/1929 | Koering |
| 1,721,306 A | 7/1929 | Koering |
| D81,134 S | 5/1930 | Henderson |
| 1,837,340 A | 12/1931 | Schwartz |
| 1,951,660 A | 3/1934 | Klaudt |
| 1,953,450 A | 4/1934 | Thompson |
| 2,131,156 A | 9/1938 | Yardley |
| 2,150,204 A | 3/1939 | Boye |
| D119,576 S | 3/1940 | Kirsch |
| 2,194,064 A | 3/1940 | Boye |
| 2,195,979 A | 4/1940 | Ziolkowski |
| 2,215,331 A | 9/1940 | Marsh |
| 2,219,075 A | 10/1940 | Veau |
| 2,250,003 A | 7/1941 | Boye |
| 2,293,168 A | 8/1942 | Pirone |
| 2,383,104 A | 8/1945 | Allen |
| 2,458,643 A | 1/1949 | Riley |
| 2,462,321 A | 2/1949 | Holmes |
| 2,519,996 A | 8/1950 | Blake |
| 2,562,371 A | 7/1951 | Shannon |
| 2,637,555 A | 5/1953 | Klaudt |
| 2,778,030 A | 1/1957 | Goche |
| 2,796,227 A | 6/1957 | Coakley |
| 2,915,327 A * | 12/1959 | Kreske ........................ 403/104 |
| 2,919,134 A | 12/1959 | Zuro |
| 2,974,806 A | 3/1961 | Seewack |
| 3,023,909 A | 3/1962 | Henry |
| 3,079,005 A | 2/1963 | Bednar |
| 3,107,361 A | 10/1963 | Glutting, Sr. |
| 3,418,665 A | 12/1968 | Long |
| 3,429,452 A | 2/1969 | Johnson |
| 3,493,121 A | 2/1970 | Doyle |
| 3,504,805 A | 4/1970 | Doyle |
| 3,521,758 A | 7/1970 | Guilfoyle, Sr. |
| 3,557,390 A | 1/1971 | Ruggles et al. |
| 3,572,511 A | 3/1971 | Triplett |
| 3,687,499 A | 8/1972 | Guilfoyle, Sr. |
| 3,864,760 A | 2/1975 | Bowen |
| D248,434 S | 7/1978 | Clivio et al. |
| 4,117,557 A | 10/1978 | McPeak et al. |
| 4,229,842 A | 10/1980 | Gilmore |
| 4,238,164 A | 12/1980 | Mazzolla |
| 4,329,076 A | 5/1982 | Coreth |
| 4,378,071 A | 3/1983 | Yakimicki |
| 4,399,917 A | 8/1983 | Ohman |
| 4,461,056 A | 7/1984 | Solinski |
| 4,496,059 A | 1/1985 | Leiter |
| 4,586,615 A | 5/1986 | Quitmann |
| 4,636,106 A | 1/1987 | Waisbrod |
| D293,297 S | 12/1987 | Wood |
| 4,754,504 A | 7/1988 | Cellini |
| 4,809,401 A | 3/1989 | Honig |
| D301,976 S | 7/1989 | Greenhut et al. |
| 4,895,471 A | 1/1990 | Geltz et al. |
| 5,022,104 A | 6/1991 | Miller |
| 5,056,753 A | 10/1991 | Lunau et al. |
| 5,103,531 A | 4/1992 | Perrotta |
| D327,421 S | 6/1992 | Pagan |
| 5,189,759 A | 3/1993 | Poore |
| 5,216,766 A | 6/1993 | Lang |
| 5,236,229 A | 8/1993 | Gonzalez |
| 5,242,065 A | 9/1993 | Hoban |
| 5,263,594 A | 11/1993 | Bianchi |
| 5,281,063 A | 1/1994 | Austin, III |
| D347,784 S | 6/1994 | Warshawsky |
| 5,330,061 A | 7/1994 | Geltz |
| 5,433,551 A | 7/1995 | Gordon |
| 5,477,964 A | 12/1995 | Hart |
| 5,484,056 A | 1/1996 | Wood |
| D374,167 S | 10/1996 | Scholl |
| 5,561,870 A | 10/1996 | Hertel |
| D376,312 S | 12/1996 | Cahn et al. |
| D377,753 S | 2/1997 | Meadows |
| D379,297 S | 5/1997 | Shires |
| 5,662,297 A | 9/1997 | Christensen et al. |
| D385,177 S | 10/1997 | Perry |
| 5,678,703 A | 10/1997 | Sawyer |
| D393,390 S | 4/1998 | Gottwald |
| D397,928 S | 9/1998 | Wise |
| 5,803,643 A | 9/1998 | Patelli et al. |
| 5,876,147 A | 3/1999 | Longo |
| 5,894,610 A | 4/1999 | Winter |
| D416,785 S | 11/1999 | Ming-Hsiao |
| D426,142 S | 6/2000 | Moore |
| D429,461 S | 8/2000 | Rowlay |
| 6,101,675 A | 8/2000 | Goldstein |
| D431,460 S | 10/2000 | Nichol |
| D438,462 S | 3/2001 | Nichol |
| 6,216,287 B1 | 4/2001 | Wise |
| 6,263,523 B1 | 7/2001 | Moore |
| 6,302,180 B1 | 10/2001 | Yu |
| 6,302,614 B1 | 10/2001 | Tseng |
| D466,399 S | 12/2002 | Jessee et al. |
| 6,543,629 B1 | 4/2003 | Samelson |
| 6,640,395 B2 | 11/2003 | Bush |
| 6,651,831 B2 | 11/2003 | Samelson |
| D483,251 S | 12/2003 | Suero, Jr. |
| 6,694,543 B2 * | 2/2004 | Moore .............................. 4/610 |
| 6,715,163 B1 | 4/2004 | Cunningham |
| D489,249 S | 5/2004 | Moore |
| 6,745,909 B1 * | 6/2004 | Lai ............................. 211/206 |
| D498,663 S | 11/2004 | Moore |
| 6,824,000 B2 | 11/2004 | Samelson |
| 6,845,955 B1 | 1/2005 | Hsu |
| 6,862,776 B2 | 3/2005 | Chen |
| 6,883,664 B2 | 4/2005 | Lee |
| D506,920 S | 7/2005 | Taylor |
| 6,913,156 B1 | 7/2005 | Wolff |
| 7,024,706 B2 | 4/2006 | Hess |
| D522,845 S | 6/2006 | Suero |
| D522,846 S | 6/2006 | Suero, Jr. |
| D522,847 S | 6/2006 | Suero, Jr. |
| 7,055,680 B2 | 6/2006 | Liebers |
| D525,115 S | 7/2006 | Harwanko |
| 7,076,815 B2 | 7/2006 | Orpilla |
| 7,111,336 B1 | 9/2006 | Lai |
| D534,062 S | 12/2006 | van den Bosch |
| D542,125 S | 5/2007 | Kaminski |
| D542,897 S | 5/2007 | Harwanko |
| D543,754 S | 6/2007 | Bauer et al. |
| D543,756 S | 6/2007 | Gilbert |
| D543,839 S | 6/2007 | Cooper et al. |
| D544,786 S | 6/2007 | Barrese |
| D547,165 S | 7/2007 | Barrese |
| D550,542 S | 9/2007 | Worrall et al. |
| D552,455 S | 10/2007 | Moore |
| 7,296,772 B2 | 11/2007 | Wang |
| D557,590 S | 12/2007 | Moore |
| D563,209 S | 3/2008 | Samelson |
| D563,526 S | 3/2008 | Bauer |
| D565,937 S | 4/2008 | Tsai |
| D567,637 S | 4/2008 | Moore |
| D576,022 S | 9/2008 | Goldstein |
| D577,991 S | 10/2008 | Chen |
| D586,647 S | 2/2009 | Didehvar |
| 7,512,997 B2 | 4/2009 | Dewees |
| 7,597,297 B2 | 10/2009 | Isfeld et al. |
| D618,542 S | 6/2010 | Bertken |
| 7,762,508 B2 | 7/2010 | Xu |
| D624,807 S | 10/2010 | Barrese |
| D624,808 S | 10/2010 | Krawczak et al. |
| 7,857,151 B2 | 12/2010 | Barrese |
| D631,273 S | 1/2011 | O'Brien et al. |
| D631,732 S | 2/2011 | Krawczak et al. |
| D633,780 S | 3/2011 | Barrese |
| D634,609 S | 3/2011 | Bauer |
| D636,660 S | 4/2011 | O'Connell |
| 7,926,127 B2 | 4/2011 | Barrese |
| 7,950,534 B2 | 5/2011 | Kao |

(56) References Cited

U.S. PATENT DOCUMENTS

| | | | |
|---|---|---|---|
| D640,078 S | 6/2011 | Gilbert | |
| 7,958,577 B2 | 6/2011 | Chang | |
| 7,987,532 B2 | 8/2011 | Bathurst et al. | |
| 7,987,534 B2 | 8/2011 | Lin | |
| 7,997,428 B2 * | 8/2011 | Goldstein | 211/105.3 |
| 8,015,633 B2 | 9/2011 | Ho | |
| D648,619 S | 11/2011 | Lowe | |
| D648,834 S | 11/2011 | Gilbert | |
| 8,056,873 B1 | 11/2011 | Hanley et al. | |
| D650,263 S | 12/2011 | Barrese | |
| 8,069,507 B2 | 12/2011 | Didehvar et al. | |
| 8,069,508 B2 | 12/2011 | O'Connell | |
| 8,146,182 B2 | 4/2012 | Bauer | |
| 8,185,981 B2 | 5/2012 | Didehvar et al. | |
| 8,214,938 B2 | 7/2012 | Hanley et al. | |
| 8,215,501 B2 | 7/2012 | Trettin et al. | |
| 8,215,863 B2 | 7/2012 | Sohn | |
| D667,295 S | 9/2012 | Harwanko | |
| 8,297,870 B2 | 10/2012 | Lenhart | |
| D671,395 S | 11/2012 | Harwanko | |
| 8,341,775 B2 | 1/2013 | Didehvar | |
| 8,505,129 B2 | 8/2013 | Parker et al. | |
| 8,505,749 B2 | 8/2013 | Trettin et al. | |
| 8,522,373 B2 | 9/2013 | Bauer | |
| D691,030 S | 10/2013 | Lindo et al. | |
| 2003/0034316 A1 | 2/2003 | Kao | |
| 2003/0052070 A1 | 3/2003 | Weisenburger | |
| 2004/0178310 A1 | 9/2004 | Marion | |
| 2004/0182806 A1 | 9/2004 | Figueroa | |
| 2005/0053423 A1* | 3/2005 | Doubler et al. | 403/374.3 |
| 2005/0230587 A1 | 10/2005 | Yang | |
| 2005/0268394 A1 | 12/2005 | Monk et al. | |
| 2006/0070177 A1 | 4/2006 | Bathurst et al. | |
| 2006/0156465 A1 | 7/2006 | Lavi et al. | |
| 2006/0218717 A1 | 10/2006 | van den Bosch | |
| 2007/0006377 A1 | 1/2007 | Moore | |
| 2007/0006378 A1 | 1/2007 | Moore | |
| 2007/0174956 A1 | 8/2007 | Heaslip | |
| 2008/0022451 A1 | 1/2008 | Urlich et al. | |
| 2008/0028513 A1 | 2/2008 | Didehvar | |
| 2008/0115265 A1 | 5/2008 | Heaslip | |
| 2008/0184479 A1 | 8/2008 | Bathurst | |
| 2008/0210827 A1 | 9/2008 | Samelson | |
| 2008/0245486 A1 | 10/2008 | Brown | |
| 2008/0245940 A1 | 10/2008 | Brown | |
| 2008/0282464 A1 | 11/2008 | Bauer | |
| 2008/0289096 A1 | 11/2008 | Patel | |
| 2009/0083905 A1 | 4/2009 | O'Connell | |
| 2011/0011813 A1 | 1/2011 | Kao | |
| 2011/0113547 A1 | 5/2011 | O'Connell | |
| 2012/0005823 A1 | 1/2012 | Baines | |
| 2012/0023657 A1 | 2/2012 | Didehvar et al. | |
| 2012/0036628 A1 | 2/2012 | O'Connell | |
| 2012/0110729 A1 | 5/2012 | Baines | |
| 2012/0152873 A1 | 6/2012 | Didehvar | |
| 2012/0152874 A1 | 6/2012 | Didehvar | |
| 2012/0167368 A1 | 7/2012 | Napier et al. | |
| 2012/0241399 A1 | 9/2012 | Trettin et al. | |
| 2012/0284914 A1 | 11/2012 | Bauer | |
| 2012/0285914 A1 | 11/2012 | Carney | |

FOREIGN PATENT DOCUMENTS

| | | |
|---|---|---|
| CN | 2228573 Y | 6/1996 |
| CN | 2349932 Y | 11/1999 |
| CN | 2566754 Y | 8/2003 |
| CN | 2835679 Y | 11/2006 |
| CN | 2893271 Y | 4/2007 |
| CN | 2902096 Y | 5/2007 |
| CN | 201001603 Y | 1/2008 |
| CN | 201189069 Y | 2/2009 |
| CN | 201363343 Y | 12/2009 |
| GB | 2325397 A | 11/1998 |
| GB | 2400813 A | 10/2004 |
| GB | 2426693 A | 12/2006 |
| JP | 2000-046021 A | 2/2000 |
| JP | 2001-112561 A | 4/2001 |
| JP | 2004-036803 A | 2/2004 |
| JP | 2004-057213 A | 2/2004 |

OTHER PUBLICATIONS

U.S. Appl. No. 29/398,880 by Lindo, filed Aug. 5, 2011.
Office Action issued Feb. 16, 2012 in U.S. Appl. No. 13/253,617.
U.S. Appl. No. 29/381,234 by Didehvar, filed Dec. 16, 2010.
U.S. Appl. No. 29/390,736 by Harwanko, filed Apr. 28, 2011.
U.S. Appl. No. 13/676,800 by Didehvar, filed Nov. 14, 2012.
U.S. Appl. No. 13/676,802 by Didehvar, filed Nov. 14, 2012.
Office Action issued Jul. 20, 2011 in U.S. Appl. No. 12/157,376.
Office Action issued Nov. 22, 2011 in U.S. Appl. No. 12/157,376.
U.S. Appl. No. 29/437,013 by Didehvar, filed Nov. 12, 2012.
U.S. Appl. No. 29/443,578 by Lindo, filed Jan. 18, 2013.
<http://www.amazon.com/Polder-Radial-Duo-Shower-Rod/dp/B001CEONRY>; Polder Radial Duo Shower Rod, web page printout date: Jun. 2, 2011; original web posting date and product availability date: unknown, 3 pages. (admitted prior art).
U.S. Appl. No. 29/398,881 by Walker, filed Aug. 5, 2011.
Photograph of Curved Shower Rod by Hardware Resources (admitted prior art).
Photograph of a curved shower rod distributed by Popular Bath Products, Inc. (admitted prior art).
Photographs of Tension Rod With End Cap and Cover (1)—Date Unknown—Admitted Prior Art.
Photographs of Tension Rod With End Cap and Cover (2)—Date Unknown—Admitted Prior Art.
Office Action issued Dec. 14, 2012 in U.S. Appl. No. 13/269,108.
U.S. Appl. No. 13/752,724 by Lindo, filed Jan. 29, 2013.
Three photographs of Maytex Mills "EZ-Up" tension rod (date unknown) (admitted prior art).
Office Action issued Jun. 21, 2013 in U.S. Appl. No. 13/752,724 by Lindo.
Office Action issued Jul. 8, 2013 in U.S. Appl. No. 13/269,108 by Didehvar.
Office Action issued Apr. 2, 2013 in U.S. Appl. No. 29/437,013.
U.S. Appl. No. 29/451,499 by Harwanko, filed Apr. 3, 2013.
U.S. Appl. No. 13/911,191 by Didehvar, filed Jun. 6, 2013.
"Masterform Tool Company; Clevis Brackets", web page printout date: Feb. 11, 2010; original web posting date and product availability date: unknown, 1 page. (admitted prior art), retrieved from: http://www.masterformtool.com/catalog.asp?category=2&class=11&subclass=0&part=0.
"Medium- to Heavy-Duty Repairable Cylinders", Aro—20546 Clevis Bracket, SKU—40769, web page printout date: Feb. 11, 2010; original web posting date: unknown, 1 page. (admitted prior art), retrieved from: http://www.drillspot.com/products/40400/ingersoll-rand__20547__clevis__bracket.
"Clevis Bracket, Material: Forging, Weldment, or Ductile Iron", web page printout date: Feb. 11, 2010; original web posting date: unknown, 1 page. (admitted prior art), retrieved from: http://www.aggressivehydraulics.com/products/cylinder-component-parts/mounts/.
JCPenney, "Curved Smart Shower Rod" (admitted prior art), retrieved from http://www.jcpenney.com/curved-smart-shower-curtain-rod/prod.jump?ppId=pp5002324584&cmvc=JCP|dept20000012|cat100250092|RICHREL&grView=&eventRootCatId=&currentTabCatId=&regId=.
Office Action issued Oct. 11, 2013 in U.S. Appl. No. 13/269,030 by Didehvar.
Office Action issued Dec. 6, 2013 in U.S. Appl. No. 13/269,108 by Didehvar.
Office Action issued Dec. 27, 2013 in U.S. Appl. No. 13/752,724 by Lindo.
U.S. Appl. No. 14/258,546 by Vaccaro, filed Apr. 22, 2014.
Office Action issued Jul. 2, 2014 in U.S. Appl. No. 13/269,108 by Didehvar.

* cited by examiner

TENSION ROD MECHANISM WITH OPPOSING THREADS

CROSS-REFERENCE TO RELATED APPLICATIONS

This application is related to U.S. Provisional Patent Application No. 61/424,458, filed Dec. 17, 2010, and claims the earlier filing dates of the provisional applications. The above-identified related application is incorporated herein by reference.

BACKGROUND OF THE INVENTION

The present invention relates generally to an adjustable tension rod mechanism, and more particularly, to an adjustable tension rod mechanism having opposing threads for locking the tension rod mechanism in place.

Adjustable length tension rods for use as curtain or shower rods are generally used as an alternative to rods that are permanently fixed to support surfaces through the use of screws, bolts, or the like. This provides for simpler installation and prevents permanent damage to the support surfaces upon removal. These tension rods typically include a first shaft that telescopingly receives a second shaft, wherein the first and second shafts house a long threaded stud. The tension rod is often shipped and purchased in a contracted state, such that a user must expand the tension rod for installation at the desired location. Once the desired length is reached, i.e., the end faces of the tension rod contact the walls or other support surfaces, the first and second shafts are rotated with respect to each other until a sufficient force is applied against the support surfaces to maintain the tension rod in compression and in place.

In tension rods having the long threaded stud, expansion is accomplished by rotating the first and second shafts with respect to one another until the desired length is reached. A user often must expand the tension rod by twenty or more inches, and the constant rotation required can be time-consuming and exhausting.

More recently, tension rods have been introduced that allow the user to easily expand the tension rod by pulling the first and second shafts in opposing directions. However, the tension rod must be pulled to a length that is larger than the distance between the support surfaces. Tension is then applied by compressing a spring within the tension rod until the desired length is achieved. Once in place, the force of the compressed spring provides the tension for holding the tension rod in place between the support surfaces. The spring can be difficult to compress, and positioning of the tension rod may scuff or damage the support surfaces as the rod is put into place. Further, if not properly locked into place, the spring may release and cause injury to the user. Because the strength of the spring must be selected to balance between user friendliness and allow the rod to support sufficient weight, which can be up to twenty pounds, weight support is often sacrificed.

Accordingly, there is a need in the art for an adjustable tension rod mechanism that is easy to expand to the desired length, but does not require spring compression or the use of other hazardous mechanisms for providing the necessary tension between the support surfaces.

BRIEF SUMMARY OF THE INVENTION

Briefly stated, one embodiment of the present invention is directed to a tension rod mechanism for a tension rod having a first outer shaft and a second inner shaft slideably received by the first outer shaft and rotatable about a longitudinal axis of the tension rod. The tension rod mechanism comprises a tapered first threaded shaft having a first screw thread with a first thread direction. A first collar threadingly engages with the first threaded shaft. The first collar is configured to be received in the first outer shaft for rotational movement therewith and slidable axial movement relative thereto and to apply a outwardly-directed radial force to the first outer shaft. A second threaded shaft has a second screw thread with a second thread direction opposite the first thread direction. The second threaded shaft fixedly connected to the first threaded shaft. A second collar is threadingly engaged with the second threaded shaft and is configured to be fixedly received in the second inner shaft for movement therewith. When the first collar is in the first outer shaft and the second collar is fixedly received in the second inner shaft, a first rotation of the first outer shaft relative to the second inner shaft increases the outwardly-directed radial force applied by the first collar to the first outer shaft, and a second rotation in a direction opposite the first rotation increases the axial distance between the first and second collars.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
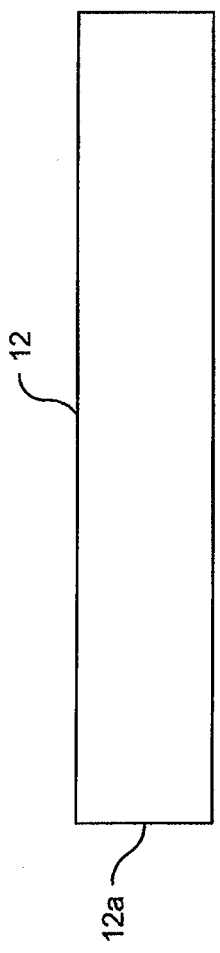
FIG. 1A is a side elevational view of a first outer shaft of a tension rod in accordance with a preferred embodiment of the present invention.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the structure to which reference is made, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first shaft could be termed a second shaft, and, similarly, a second shaft could be termed a first shaft, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a tension rod mechanism in accordance with the present invention.

Figure 1B:
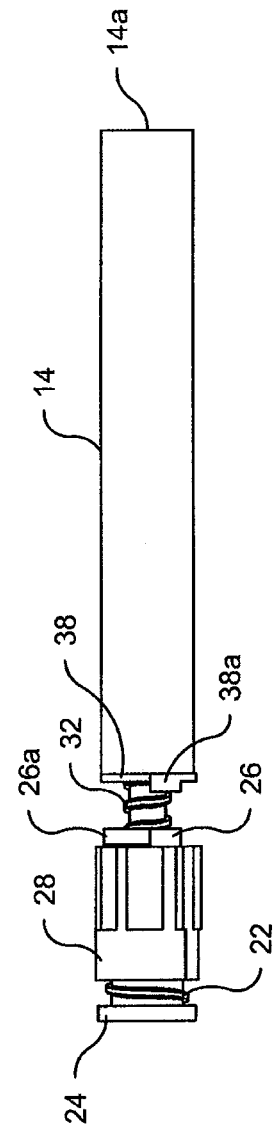
FIG. 1B is a side elevational view of a second inner shaft of a tension rod in accordance with a preferred embodiment of the present invention.
Figure 2:
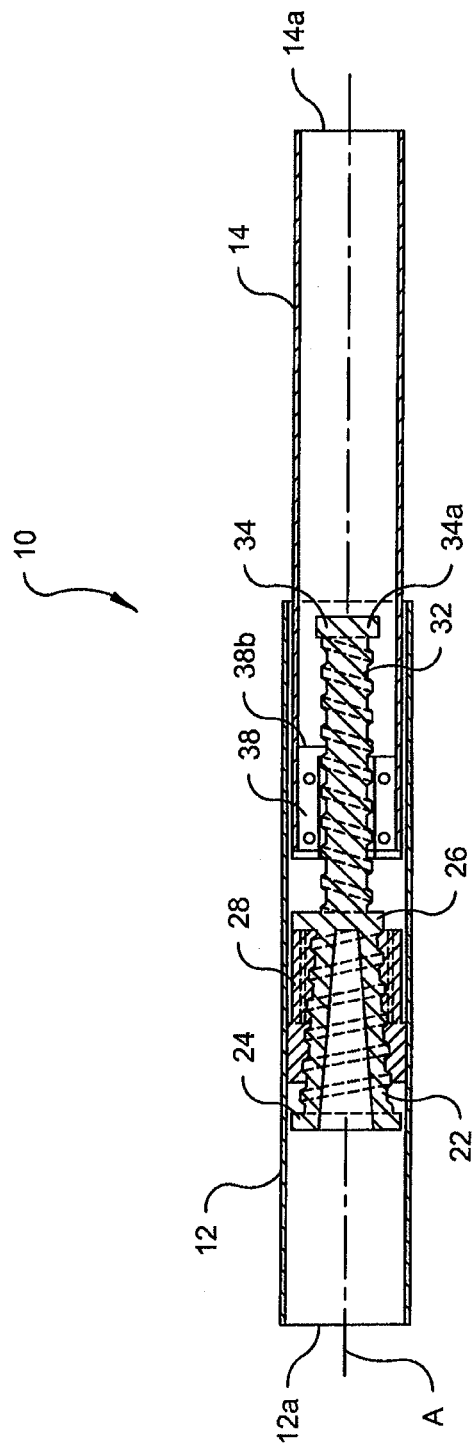
FIG. 2 is a cross-sectional view of the tension rod assembled from the first and second shafts shown in FIGS. 1A-1B.
Figure 3:
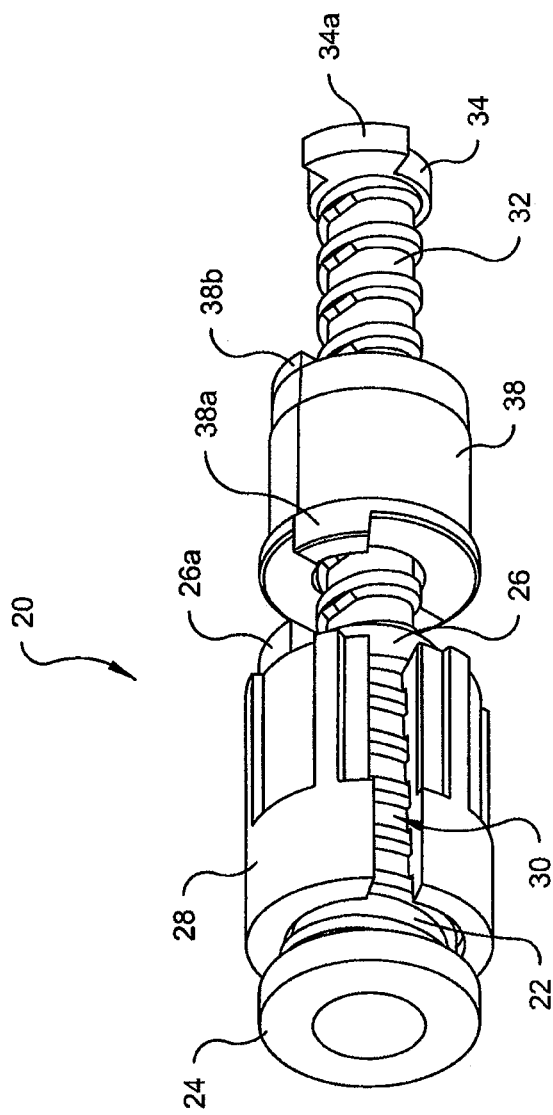
FIG. 3 is an enlarged perspective view of a tension mechanism for use with the tension rod of FIG. 2.

Referring to the drawings in detail, where the same numerals indicate like elements throughout, there is shown in FIGS. 1-3 a first preferred embodiment of a tension rod generally designated 10, and hereinafter referred to as the "tension rod" 10 having a preferred embodiment of a tension rode mechanism generally designated 20 and hereinafter referred to as the "tension mechanism" 20 in accordance with the present invention.

The tension rod 10 has a first outer shaft 12 and a second inner shaft 14. The second inner shaft 14 is slideably received by the first outer shaft 12 along a longitudinal axis A of the tension rod 10, such that the tension rod 10 is adjustable in length. The first and second shafts 12, 14 are preferably made from a metal, such as cold-rolled steel, but may also be constructed using polymeric material.

Opposing ends of the first and second shafts 12, 14 may terminate in flat end faces 12a, 14a, respectively, to engage a window frame or opposing walls to support the tension rod 10 above a ground surface. Alternatively, the opposing ends of the first and second shafts 12, 14 may be fitted with semi-pliable end caps (not shown), each having a flat end face. Each of the first and second shafts 12, 14 are preferably at least partially hollow along the longitudinal axis A for receiving respective ends of the tension mechanism 20.

Referring to FIGS. 1B and 3, a first end of the tension mechanism 20 includes a first threaded shaft 22 that may be terminate by a first end flange 24 at one end and a center flange 26 at the other end. The first threaded shaft 22 has a first screw thread with a first thread direction. As can be seen in the cross-sectional view of FIG. 2, a diameter of the first threaded shaft 22 is larger proximate the first end flange 24 than a diameter of the first threaded shaft 22 proximate the center flange 26. That is, the first threaded shaft 22 is tapered having a generally frusto-conically shape.

A first collar 28 threadingly engages with the first threaded shaft 22. The first collar 28 is configured to be received in the first outer shaft 12 for rotational movement therewith and slidable axial movement relative thereto along the longitudinal axis A and to apply an outwardly-directed radial force to the first outer shaft. In a preferred embodiment, the first collar 28 is configured to be received in the first outer shaft 12 in a compression fit with the frictional force between the first collar and the first outer shaft 12 being sufficient to prevent rotation of the first collar 28 relative to the first outer shaft 12 when the first threaded shaft is rotated in the first collar 28.

The first collar 28 is preferably made from rubber, preferably of low durometer. However, other materials may be used, such as polycarbonate, polystyrene, polypropylene, acrylonitrile butadiene styrene (ABS), styrene acrylonitrile (SAN), polyurethane, polyvinyl chloride (PVC), or the like.

The first collar 28 has a longitudinally-extending circumferentially-expandable slot 30 giving the first collar 28 a substantially C-shaped cross-section. The slot 30 allows a diameter of the first collar 28 to expand as the first collar 28 is rotated along the taper of the first threaded shaft 22 from a contracted state near the center flange 26 in which the first collar 28 is slidable along the longitudinal axis A to an expanded state (not shown) near the first end flange 24 in which the first collar 28 is no longer able to move axially in the first outer shaft 12.

Referring to FIGS. 2 and 3, a second end of the tension mechanism 20 includes a second threaded shaft 32 that may be terminated by the center flange 26 at one end and a second end flange 34 at the other end. The second threaded shaft has a second screw thread with a second thread direction opposite the first thread direction. The second threaded shaft is fixedly connected to the first threaded shaft by the center flange 26. A diameter of the second shaft 32 is preferably constant along the longitudinal axis A. The first threaded shaft 22, second threaded shaft 32, and the flanges 24, 26, 34 are preferably integrally formed as a single part molded from a polymeric material. Specifically, materials such as polycarbonate, polystyrene, polypropylene, ABS, SAN, polyurethane, PVC, rubber, or the like may be used. However, the shafts 22, 32 and flanges 24, 26, 34 may also be separate pieces assembled together and made of differing materials.

A second collar 38 threadingly engages with the second threaded shaft 32 and is configured to be fixedly received in the second inner shaft 14 for movement therewith. Preferably, the second collar 38 is press fit into the second inner shaft 14, and a dimple (not shown) is subsequently formed in the second shaft 14 to further lock the second collar 38 in place. However, the second collar 38 may also be fixed to the second inner shaft 14 by other methods, such as the use of adhesives, fasteners, welds, or the like. The second collar is preferably molded from a polymeric material such as polycarbonate, polystyrene, polypropylene, ABS, SAN, polyurethane, PVC, rubber, or the like. The second collar 38 has a first stop 38a that prevents the second collar from rotating relative to the second threaded shaft 14 when the first stop 38a abuts a central flange stop 26a extending radially outwardly from the central flange 26. In some embodiments, the second collar 38 may also have a second stop 38b that also that prevents the second collar 38 from rotating relative to the second threaded shaft 32 when the second stop 38b abuts an end flange stop 34a extending radially outwardly from the second end flange 34 of the second threaded shaft 32.

When the first collar 28 is in the first outer shaft 12 and the second collar 38 is fixedly received in the second inner shaft 14, a first rotation of the first outer shaft 12 relative to the second inner shaft 14 increases the outwardly-directed radial force applied by the first collar 28 to the first outer shaft 12, and a second rotation in a direction opposite the first rotation increases the axial distance between the first and second collars 28, 38 and therefore the overall length of the tension rod 10. If the flat end faces 12a, 14a of the tension rod 10 are in contact with opposed support surfaces (not shown) preventing further extension of the tension rod 10, rotation in the second direction increases the axial loading and hence the tension in the rod 10.

In use, the tension rod 10 is initially assembled with the tension mechanism 20 in an initial (or starting) configuration in which the first and second collars 28, 38 preferably abut the center flange 26, and the first stop 38a of the second collar 38 preferably abuts the center flange stop 26a. The second collar 38 is fixedly received in the second inner shaft 14 for movement therewith with the second threaded shaft 32 extending beyond the second collar 38 within the second inner shaft 14. The first threaded collar 28 together with the end portion of the second inner shaft 14 to which the second collar 38 is fixedly attached are inserted in the first outer tube 12.

A user adjusts a length of the tension rod 10 by sliding the first and second shafts 12, 14 with respect to one another along the longitudinal axis A until the tension rod 10 is level between two support surfaces (not shown) and the flat end faces 12a, 14a are in contact with the support surfaces. When the desired length is reached, the first and second shafts 12, 14 are rotated with respect to one another in a first direction such that force applied by the first stop 38a against the center flange stop 26a causes the first and second threaded shafts 22, 32 to rotate in unison with respect to the first collar 28. The collar 28 moves away from the center flange 26 and toward the first end flange 24. Expansion of the first collar 28 as it rotates along the increasing diameter of the first threaded shaft 22 increases the outwardly-directed radial force applied by the first collar 28 to the first outer shaft 12, preventing further axial movement of the first collar 28 in the first outer shaft 12 and releasably securing with an expansion fit the first collar 28 in a fixed position in the first outer shaft 12.

With the first collar 28 secured in place in the first outer shaft 12 and the second collar 38 fixedly attached to the second inner shaft 14, the second inner shaft 14 is rotated with respect to the first outer shaft 12 in a second direction opposite to the first direction. The movement of the second collar 38 along the second threaded shaft 32 away from the center flange 26 and toward the second end flange 34 increases the axial distance between the first and second collars 28, 38 and therefore the overall length of the tension rod 10. If the flat end faces 12a, 14a of the tension rod 10 are in contact with opposed support surfaces preventing further extension of the tension rod 10, rotation in the second direction increases the axial loading and hence the tension in the rod 10.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

I claim:

1. A tension rod comprising:
a first outer shaft;
a second inner shaft slideably received by the first outer shaft and rotatable about a longitudinal axis of the tension rod; and
a tension rod mechanism operatively coupling the first outer shaft and the second inner shaft, the tension rod mechanism comprising:
a tapered first threaded shaft having a first end and an opposing second end, and being completely threaded with a first screw thread having a first thread direction from the first end to the second end, and completely tapered from the first end to the second end, a diameter of the first end of the tapered first threaded shaft being larger than a diameter of the second end of the tapered first threaded shaft;
a first expandable collar threadingly engaged with the first threaded shaft, the first collar configured to be received in the first outer shaft for rotational movement therewith and slidable axial movement relative thereto and to apply an outwardly-directed radial force to the first outer shaft;
a second threaded shaft having a second screw thread with a second thread direction opposite the first thread direction, the second threaded shaft being fixedly connected to the first threaded shaft; and
a second collar threadingly receiving the second threaded shaft therein and being fixedly received in the second inner shaft for movement therewith, the second collar having a longitudinally extending second collar stopper projecting in the direction of the central flange stopper;
a center flange integrally formed as a single part with and located between the first threaded shaft and the second threaded shaft, the center flange having a radially projecting central flange stopper;
wherein relative rotation between the first outer shaft and the second inner shaft in a first direction draws the second collar stopper into circumferential abutment with the central flange stopper and prevents relative rotation between the second collar and the second threaded shaft, further rotation between the first out shaft and the second inner shaft after abutment of the stoppers causes the tapered first threaded shaft to apply the outwardly directed radial force to fixedly couple the first collar to the first outer shaft, after the first collar is fixedly coupled to the first outer shaft relative rotation between the first outer shaft and the second inner shaft in an opposite second direction increases the distance between the first and second collars.

2. The tension rod mechanism according to claim 1, wherein the first collar has a longitudinally extending circumferentially expandable slot.

3. The tension rod mechanism according to claim 1, wherein the second threaded shaft has a constant diameter along the longitudinal axis.

* * * * *